Dec. 5, 1961  E. J. MARTIN  3,012,144
TACHOMETER
Filed June 12, 1957
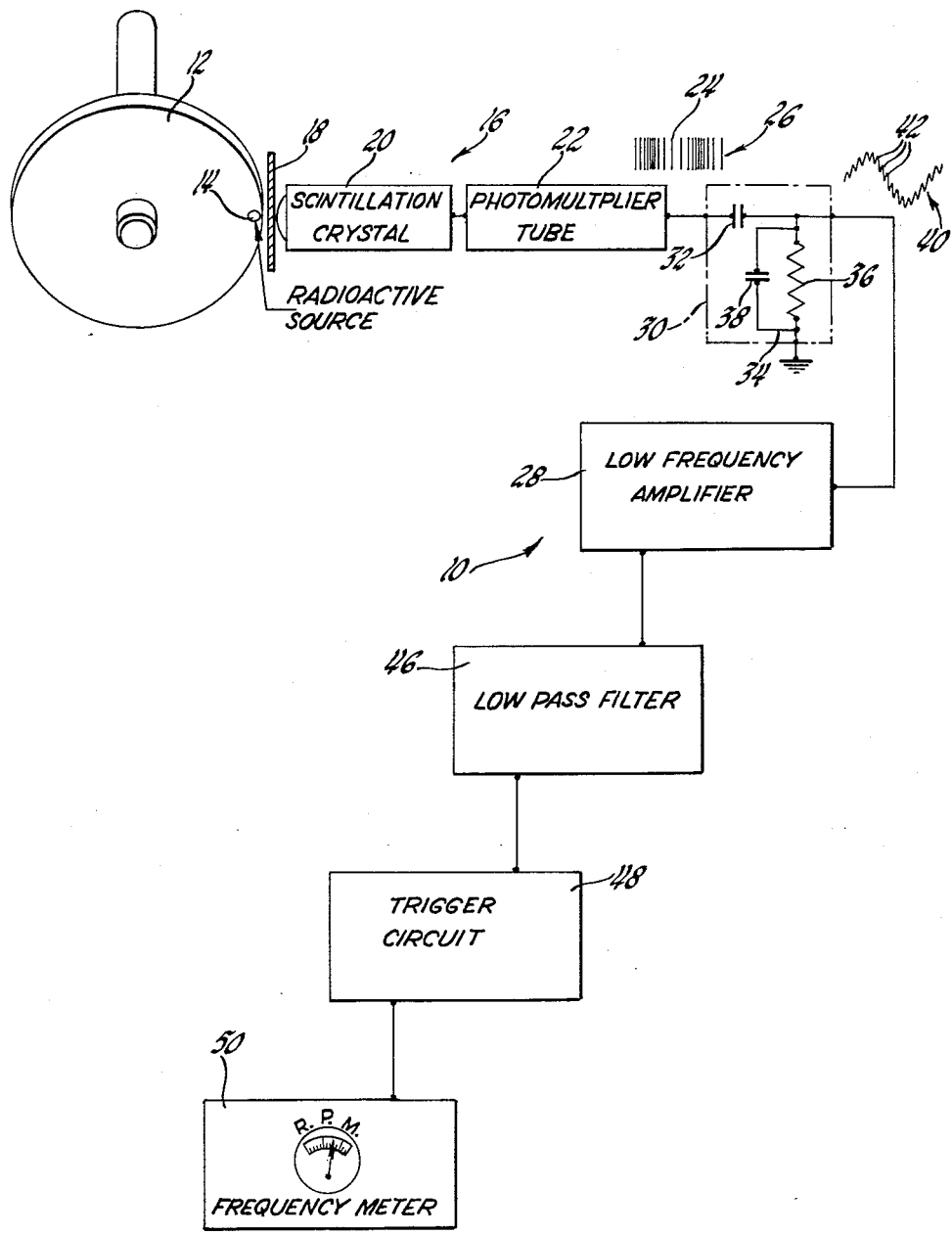
INVENTOR
Edward J. Martin
BY
L. D. Burch
ATTORNEY 3,012,144
TACHOMETER
Edward J. Martin, Pleasant Ridge, Mich., assignor to General Motors Corporation, Detroit, Mich., a corporation of Delaware
Filed June 12, 1957, Ser. No. 665,209
10 Claims. (Cl. 250—83.3)

The present invention relates to means for determining the speed of a rotating member and, more particularly, to means for measuring the rotational speed of a member disposed in an inaccessible location.

Not infrequently, it is desirable to measure the speed of a rotating member disposed in a relatively inaccessible location. For example, in the study of gas turbines, automatic transmissions, etc., there are rotating members contained inside of the structure that are not directly connected to anything that is readily accessible from the exterior of the structure. In other words, these members rotate as a result of the reaction of gases or fluids thereon and are free to assume a rotational speed entirely their own. As a result, it is very difficult, if not impossible, to connect any conventional type of tachometer thereto for directly measuring the speed of rotation.

It has been proposed under such circumstances to provide the rotating member with a piece of radioactive material that is eccentrically mounted thereon. A radiation pickup or detector such as a scintillation crystal may then be located remote from the rotating member to sense the radiations from the piece of radioactive material. As the radioactive material moves past the pickup, the individual radiations will produce a train of pulses in the output of the pickup. When the distance between the pickup and the source of radiation is the least, the rate at which the radiations strike the pickup will be the greatest and, conversely, when the distance is the greatest, the rate will be the least. As a result, the pulse train will be frequency modulated by a frequency equal to the speed of rotation of the rotating member. It has been the practice to employ an amplifier to increase the amplitude of the individual pulses to a more useful level and then frequency demodulate the pulse train. The demodulator will have a substantially sine wave output whose frequency is proportional to the speed of rotation. Thus by feeding the sine wave signal into a properly calibrated frequency meter, the speed of rotation of the rotating member may be readily indicated.

Although the foregoing arrangment has been found very effective to measure rotational speeds, the pulse amplifier must have a sufficiently high frequency response to be capable of individually amplifying the individual pulses. Even by employing an amplifier of advance design, this imposes a limit on the count rate from the piece of radioactive material. This, in turn, imposes a serious limitation on the maximum speed that can be measured by this method.

It is now proposed to provide a system adapted to measure the speed of rotation of a rotating member without being subject to the foregoing limitations. This system employs a piece of radioactive material eccentrically mounted on the rotating member and a radiation detector for sensing the radiation therefrom. However, instead of interconnecting the detector with a high frequency amplifier capable of responding to the individual radiation pulses, the detector is directly interconnected with a low frequency amplifier by a coupling capable of integrating the pulse train. As a result, the pulse train will be converted directly into a substantially sine wave signal having a frequency equal to that of the speed of rotation. This sine wave may then be fed into a frequency meter effective to indicate the speed of rotation. It may thus be seen that the circuitry is not required to preserve the individual pulses. As a result, the frequency response of the amplifier is only required to be adequate to cover the highest speed of rotation that is to be measured. In addition, the radioactive source may have a high count rate, thereby further increasing the highest rotational speed that can be measured.

In the one sheet of drawings:
The figure is a block diagram of a speed measuring system embodying the present invention.

Referring to the drawing in more detail, the present invention is particularly adapted to be employed in a system 10 for measuring the speed of a rotating member 12. This system 10 includes a piece 14 of radioactive material such as five millicures of cobalt-60, that is mounted eccentrically on the rotating member 12, preferably adjacent the periphery thereof. A suitable radiation pickup or detector 16 may be provided outside of the housing 18 so as to be subject to bombardment from the radioactive source 14.

In the present instance the radiation pickup 16 comprises a scintillation crystal 20 and a photomultiplier tube 22. Each radiation that is absorbed by the scintillation crystal 20 will produce a flash of light that will be observed by the photomultiplier tube 22. When the flash of light strikes the photomultiplier tube 22, it will produce an electrical pulse in the output. The frequency of these pulses 24 will be dependent upon the count rate of the radioactive source 14 and the distance between the source 14 and the crystal 20. When the source 14 is closest to the crystal 20, the pulse frequency will be a maximum and when the source 14 is farthest from the crystal 20, the frequency will be a minimum. It may thus be seen that the radiations striking the pickup 16 will produce a pulse train 26 from the photomultiplier tube 20 which is frequency modulated by a frequency corresponding to the speed of rotation of the member 12.

The output of the photomultiplier tube 22 is direct coupled to a low frequency amplifier 28 by an integrating coupling 30. This coupling 30 includes a coupling condenser 32 and time delay circuit 34 having a resistor 36 and condenser 38 in parallel. The resistor 36 and condenser 38 preferably have a long RC time constant relative to the pulse frequency. For example, the resistor 36 may be 2 megohms and the condenser 38 0.01 microfarads. This relatively long time constant will cause the condenser 38 to build up a charge proportional to the pulse rate or to frequency demodulate them. The resultant signal 40 will be substantially a sine wave having a series of saw tooth irregularities 42 produced by the individual pulses 24. This signal 40 will have a frequency equal to the speed of the rotating member 12. It is fed into a low frequency amplifier 28 to thereby increase the amplitude to a more useful level. The amplified signal should be substantially a sine wave, but it may still have a series of small irregularities superimposed thereon. Accordingly, a low pass filter 46 may be provided which will remove the irregularities 42. After filtering the signal may be amplified again, if necessary, and then fed into a trigger circuit 48. This trigger circuit 48 may be of any suitable type; for example, a so-called Schmitt trigger circuit. This circuit 48 is conductive whenever the amplitude of the sine wave is greater than some predetermined amount. As a result, a square wave is produced once each cycle.

The trigger circuit 48 is, in turn, interconnected with a frequency meter 50 into which the square wave is fed. This meter is effective to indicate the frequency of the signal and, if desired, may be calibrated to read the revolutions per minute of the revolving member 12.

It may thus be seen that a speed measuring system 10 has been provided that is capable of measuring high speed rotating members. Since the individual pulses 24 produced by the radioactive material 14 are immediately integrated to form a sine wave, the amplifier 28 will not be limited by the count rate of the radioactive material 14. Accordingly, the source 14 of radioactivity may have a sufficiently high count rate to produce a reliable and accurate determination of extremely high speeds of rotation.

It is to be understood that, although the invention has been described with specific reference to a particular embodiment thereof, it is not to be so limited since changes and alterations therein may be made which are within the full intended scope of this invention as defined by the appended claims.

The claims:

1. In apparatus for measuring the speed of a rotating member when said member is disposed within a housing, a source of radioactivity eccentrically mounted on said member and adapted to emit radiations capable of penetrating said member and said housing, a radiation detecting device disposed outside of said housing for sensing the radiations from said source and producing a train of pulses having an instantaneous spacing corresponding to the distance between said detecting device and said source, and means connected to said detecting device to receive said train of pulses and adapted to produce an indication of the rate of variation of said spacing.

2. In apparatus for measuring the speed of a rotating member when said member is disposed within a housing, a source of radioactivity eccentrically mounted on said member and adapted to emit radiations capable of penetrating said member and said housing, a radiation detecting device disposed outside said housing for sensing the radiations from said source and producing a train of pulses having an instantaneous spacing corresponding to the distance between said detecting device and said source, means connected to said detecting device to receive said train of pulses and adapted to produce an output voltage having a magnitude that is inversely related to said spacing, and indicating means connected to receive said output voltage and adapted to produce an indication of the frequency of variations in the magnitude thereof.

3. In apparatus for measuring the speed of a rotating member when said member is disposed within a housing, a source of gamma radiation eccentrically mounted on said member and adapted to emit radiations capable of penetrating said member and said housing, a radiation detecting device disposed outside of said housing for sensing the radiations from said source and producing a continuous train of pulses having an instantaneous spacing corresponding to the distance between said detecting device and said source whereby the frequency of variations in said spacing will be dependent upon the rotational speed of said member, and means connected to said detecting device to receive said train of pulses and adapted to produce an indication of the frequency of variations in said spacing.

4. In apparatus for measuring the speed of a rotating member when said member is disposed within a housing, a source of gamma radiation eccentrically mounted on said member and adapted to emit gamma radiations capable of penetrating said member and said housing, a radiation detecting device disposed outside said housing for sensing the radiations from said source and producing a continuous train of pulses having an instantaneous spacing corresponding to the distance between said detecting device and said source, integrating means connected to said detecting device to receive said train of pulses and adapted to produce an output voltage having a magnitude that is inversely related to said spacing, and indicating means connected to receive said output voltage and adapted to produce an indication of the frequency of variations in the magnitude thereof whereby an indication of the rotational speed of said member is obtained.

5. Means for indicating the speed of rotation of a rotating member when said member is disposed within a housing, said means comprising a source of radioactivity eccentrically mounted on said rotating member and adapted to emit radiations capable of penetrating said member and said housing, a radiation detector adapted to be disposed in juxtaposition to said rotating member outside of said housing for sensing the radiation from said source and producing a pulse train in response thereto, said pulse train being frequency modulated in response to the distance between said detector and said source, means directly interconnected with the outlet of said detector and responsive to said pulses from said detector for frequency demodulating said pulse train to produce a signal, and a frequency meter responsive to said signal for indicating the frequency thereof.

6. Means for indicating the speed of rotating of a rotating member when said member is disposed within a housing, said means comprising a source of radioactivity eccentrically mounted on said rotating member adapted to emit radiations capable of penetrating said member and said housing, a radiation detector adapted to be disposed in juxtaposition to said rotating member outside of said housing for sensing the radiations from said source and producing a pulse train, said pulse train being frequency modulated in response to the distance between said detector and said source, a frequency measuring means adapted to indicate the frequency of a signal, a coupling directly interconnecting said detector with said frequency measuring means for demodulating said pulse train and transmitting an integrated signal to said frequency measuring means.

7. Means for measuring the speed of rotation of a rotating member while said member is disposed within a housing, said means comprising a source of radioactive material adapted to be mounted on said rotating member and effective to emit radiations capable of penetrating said member and said housing, radiation detecting means adapted to be disposed in juxtaposition to said rotating member outside said housing for sensing the individual radiations from said source and producing a continuous pulse train, integrating means directly interconnected with said detecting means for integrating said pulse train from said detecting means, an amplifier interconnected with said integrating means for amplifying the integrated signal, and a frequency meter interconnected with said amplifier for indicating the frequency of said signal.

8. Means for measuring the speed of rotation of a rotating member while said member is disposed within a housing, said means comprising a source of radioactive material eccentrically mounted on said rotating member and effective to emit radiations capable of penetrating said member and said housing, radiation detecting means adapted to be disposed in juxtaposition to said rotating member outside of said housing for sensing the individual radiations from said source and producing a train of pulses in response thereto, said pulse train being frequency modulated in response to the distance between said detector and said source, a frequency meter for indicating the frequency of a signal, said meter including an amplifier in the input thereto, a coupling directly interconnecting said detector with said amplifier and being effective to integrate the individual pulses from said source.

9. Means for measuring the speed of rotation of a rotating member while said member is disposed within a housing, said means comprising a source of radioactive material eccentrically mounted on said rotating member and adapted to emit radiations capable of penetrating said member and said housing, radiation detecting means disposed adjacent said rotating member outside said housing for sensing the individual radiations from said source and producing a pulse train in response thereto that is frequency modulated in proportion to the speed of rotation of said member, a frequency measuring means adapted to indicate the frequency of a signal, a coupling for interconnecting said detecting means with said frequency measuring means, said coupling including a reactance having a time constant relatively long compared to the frequency of said pulses for integrating the pulses in said train.

10. Means for measuring the speed of rotation of a rotating member while said member is disposed within a housing, said means comprising a source of radioactive material eccentrically mounted on said rotating member and adapted to emit radiations capable of penetrating said member and said housing, radiation detecting means adapted to be disposed in juxtaposition to said rotating member outside said housing for sensing the individual radiations form said source and producing a pulse train in response thereto that is frequency modulated in proportion to the speed of rotation of said member, a frequency measuring means adapted to indicate the frequency of a signal, said frequency measuring means including an amplifier in the input thereto, a coupling for directly interconnecting said detecting means with said amplifier, said coupling including a capacitor and resistor having a long time constant compared to the frequency of said pulses for integrating said pulse train.

References Cited in the file of this patent

UNITED STATES PATENTS

| | | |
|---|---|---|
| 2,683,813 | Friedman | July 13, 1954 |
| 2,692,951 | Voel Ker | Oct. 26, 1954 |
| 2,896,084 | MacDonald | July 21, 1959 |